(12) United States Patent
Lee et al.

(10) Patent No.: US 11,084,434 B2
(45) Date of Patent: Aug. 10, 2021

(54) SMART DOOR APPARATUS OF A CONSTRUCTION MACHINE

(71) Applicant: DOOSAN INFRACORE CO., LTD., Incheon (KR)

(72) Inventors: Boram Lee, Incheon (KR); Jaeseung Jeon, Incheon (KR); Minkyu Yang, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 16/672,771

(22) Filed: Nov. 4, 2019

(65) Prior Publication Data

US 2020/0141168 A1    May 7, 2020

(30) Foreign Application Priority Data

Nov. 5, 2018   (KR) .................. 10-2018-0134173

(51) Int. Cl.
```
B60R 99/00      (2009.01)
B60R 16/02      (2006.01)
B60R 16/03      (2006.01)
E05D 11/00      (2006.01)
E02F 9/16       (2006.01)
```
(52) U.S. Cl.
CPC ...... *B60R 16/0215* (2013.01); *B60R 16/0207* (2013.01); *B60R 16/03* (2013.01); *E05D 11/0054* (2013.01); *E05D 11/0081* (2013.01); *E02F 9/16* (2013.01); *E05Y 2900/518* (2013.01); *E05Y 2900/531* (2013.01)

(58) Field of Classification Search
CPC .......... B60J 5/00; B60J 5/04; B60R 16/0207; B60R 16/0215; B60R 16/0222
USPC ................ 296/190.11, 146.4, 155, 146.11
See application file for complete search history.

(56) References Cited

U.S. PATENT DOCUMENTS

| | | | |
|---|---|---|---|
| 6,534,713 B2 * | 3/2003 | Kafer | ................ B60R 16/0215 174/72 A |
| 7,943,854 B1 | 5/2011 | Lipp | |
| 2009/0160211 A1* | 6/2009 | Krishnan | ................ E05B 81/78 296/146.4 |
| 2012/0001454 A1* | 1/2012 | Murakami | ............ E05B 1/0015 296/190.11 |

FOREIGN PATENT DOCUMENTS

| | | |
|---|---|---|
| CN | 102330528 A | 1/2012 |
| EP | 1184230 A1 | 3/2002 |

(Continued)

OTHER PUBLICATIONS

Extended European Search Report dated Apr. 3, 2020 in connection with the counterpart European Patent Application No. 19207067.0.

*Primary Examiner* — Dennis H Pedder
(74) *Attorney, Agent, or Firm* — Hauptman Ham, LLP

(57) ABSTRACT

A smart door apparatus may include an actuator and a harness. The actuator may be installed at a door rotatably connected with a cabin of the construction machine via a hinge mechanism. The actuator may be configured to operate a locking apparatus of the door by signals of a smart key. The harness may be arranged in an axial direction of the hinge mechanism to supply electricity to the actuator. Thus, only torsion may be applied to the harness regardless of rotation angles of the door to increase a lifespan of the harness.

10 Claims, 8 Drawing Sheets

(56) References Cited

FOREIGN PATENT DOCUMENTS

| | | |
|---|---|---|
| GB | 2274553 A | 7/1994 |
| JP | 9-243861 A | 9/1997 |
| WO | 03/029590 A1 | 4/2003 |
| WO | 2009/011624 A1 | 1/2009 |

* cited by examiner

SMART DOOR APPARATUS OF A CONSTRUCTION MACHINE

CROSS-REFERENCE TO RELATED APPLICATION

This application claims the benefit of Korean Patent Application No. 10-2018-0134173, filed on Nov. 5, 2018, in the Korean Intellectual Property Office, the disclosure of which is incorporated herein in its entirety by reference.

BACKGROUND

1. Field

Example embodiments relate to a smart door apparatus of a construction machine. More particularly, example embodiments relate to a harness of a smart door apparatus in a construction machine.

2. Description of the Related Art

Generally, a construction machine may include a cabin. A door may be rotatably connected with the cabin via a hinge. The door may include a manual type locking apparatus and an automatic type locking apparatus. Particularly, an automatic type locking apparatus may be operated by signals of a smart key. The above-mentioned function may be operated by a smart door apparatus. The smart door apparatus may include an actuator driven by the signals of the smart key, and a harness configured to supply electricity to the actuator.

According to related arts, the harness may be installed at the door. Thus, the harness may be repeatedly bent by rotations of the door. The repeatedly bent harness may be disconnected. As a result, a lifespan of the harness may be reduced.

SUMMARY

Example embodiments provide a smart door apparatus of a construction machine that may be capable of increasing a lifespan of a harness.

According to example embodiments, there may be provided a smart door apparatus of a construction machine. The smart door apparatus may include an actuator and a harness. The actuator may be installed at a door rotatably connected with a cabin of the construction machine via a hinge mechanism. The actuator may be configured to operate a locking apparatus of the door by signals of a smart key. The harness may be arranged in an axial direction of the hinge mechanism to supply electricity to the actuator.

In example embodiments, the hinge mechanism may include an upper hinge connected to an upper end of the door, and a lower hinge connected to a lower end of the door. The harness may be extended in the axial direction between the upper hinge and the lower hinge.

In example embodiments, the smart door apparatus may further include an upper clamp and a lower clamp. The upper clamp may be installed adjacent to the upper hinge to fix an upper end of the harness. The lower clamp may be installed at the lower end of the door adjacent to the lower hinge to fix a lower end of the harness.

In example embodiments, the upper clamp may include an upper guide hole configured to receive the upper end of the harness, and an upper guide groove extended from the upper guide hole to guide the harness in the axial direction.

In example embodiments, the upper guide hole may be shifted from the axial direction. A lower end of the upper guide groove may be positioned on the axial direction.

In example embodiments, the lower clamp may include a lower guide hole configured to receive the lower end of the harness, and a lower guide groove extended from the lower guide hole to guide the harness in the axial direction.

In example embodiments, the lower guide hole may be shifted from the axial direction. An upper end of the lower guide groove may be positioned on the axial direction.

In example embodiments, the smart door apparatus may further include an upper cover configured to cover the upper clamp, and a lower cover configured to cover the lower clamp.

In example embodiments, the smart door apparatus may further include a sealant configured to fill a space between the lower cover, the lower clamp and the lower end of the harness to fix the harness.

In example embodiments, the harness may be arranged on an outer surface of the door in the axial direction. The harness may enter into the door to be connected to the actuator.

In example embodiments, the smart door apparatus may further include at least one clip configured to fix the harness in the door to an inner surface of the door.

According to example embodiments, the harness may be arranged in the axial direction of the hinge mechanism so that only torsion may be applied to the harness regardless of rotation angles of the door. Thus, the harness may not be bent by a rotation of the door to prevent a disconnection of the harness. As a result, a lifespan of the harness may be increased.

BRIEF DESCRIPTION OF THE DRAWINGS

Example embodiments will be more clearly understood from the following detailed description taken in conjunction with the accompanying drawings.

FIG. 1 is a perspective view illustrating a cabin of a construction machine with a smart door apparatus in accordance with example embodiments;

FIG. 2 is a perspective view illustrating an internal structure of the smart door apparatus in FIG. 1;

FIG. 3 is a cross-sectional view illustrating a harness of the smart door apparatus in FIG. 2;

FIGS. 4 and 5 are perspective views illustrating an upper end of the harness of the smart door apparatus in FIG. 1;

FIGS. 6 and 7 are perspective views illustrating a lower end of the harness of the smart door apparatus in FIG. 1;

FIG. 8 is a perspective view illustrating an internal structure of the lower end of the harness in FIG. 7;

FIG. 9 is a perspective view illustrating a closed door in FIG. 1; and

FIG. 10 is a perspective view illustrating an opened door in FIG. 1.

DETAILED DESCRIPTION OF THE EMBODIMENTS

Figure 1:
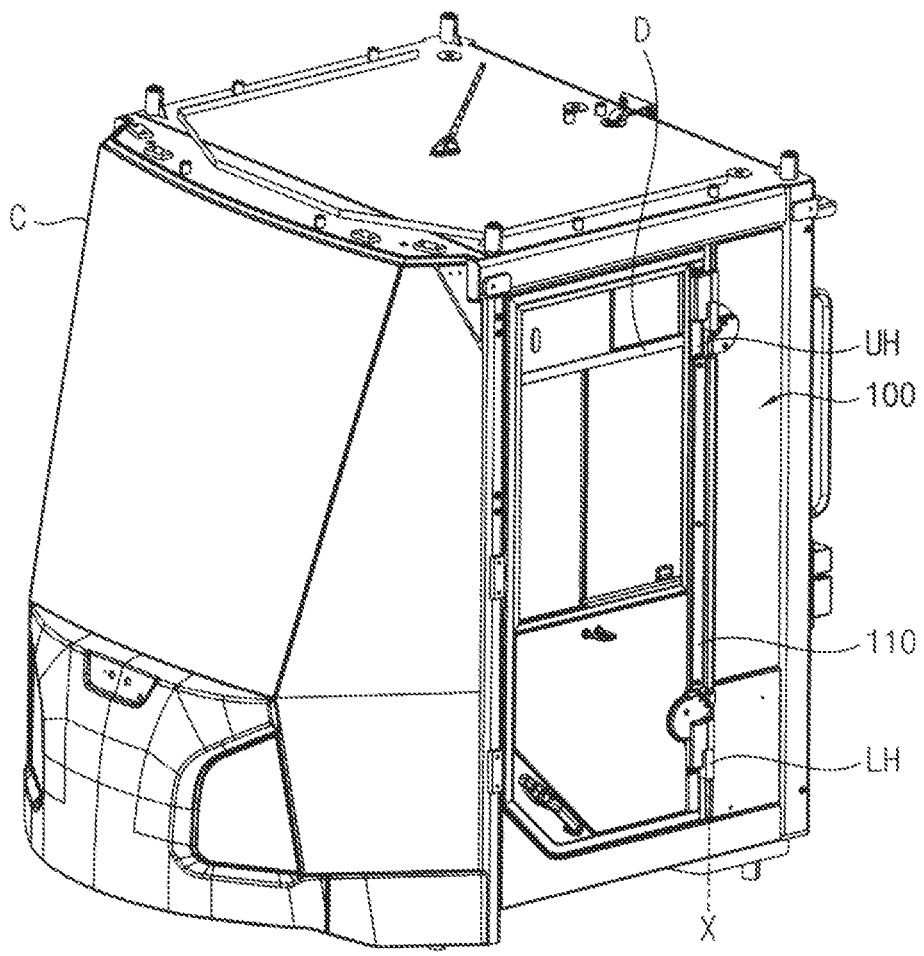
FIGS. 1 to 10 represent non-limiting, example embodiments as described herein.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
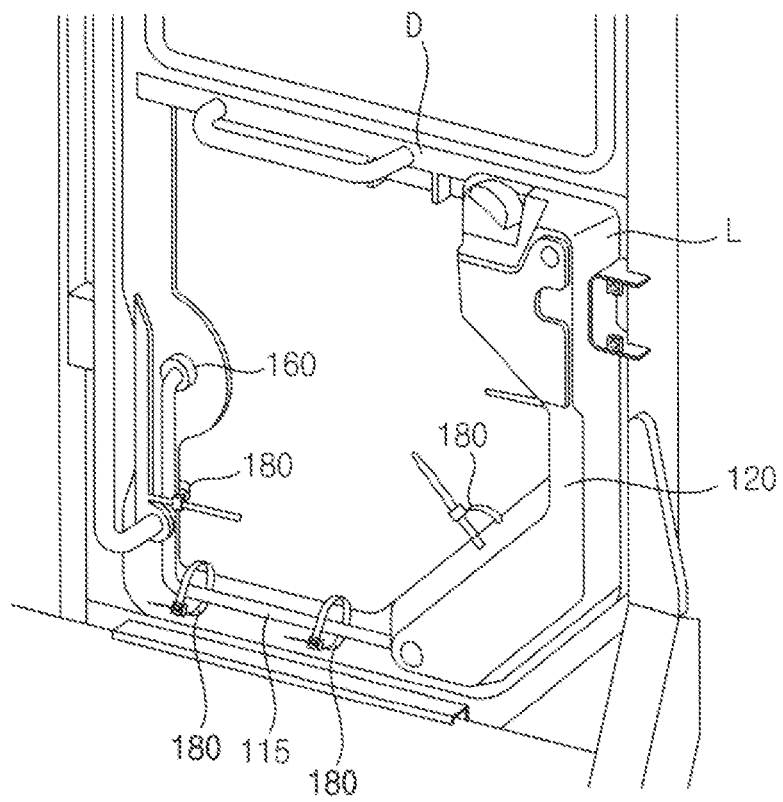
Figure 3:
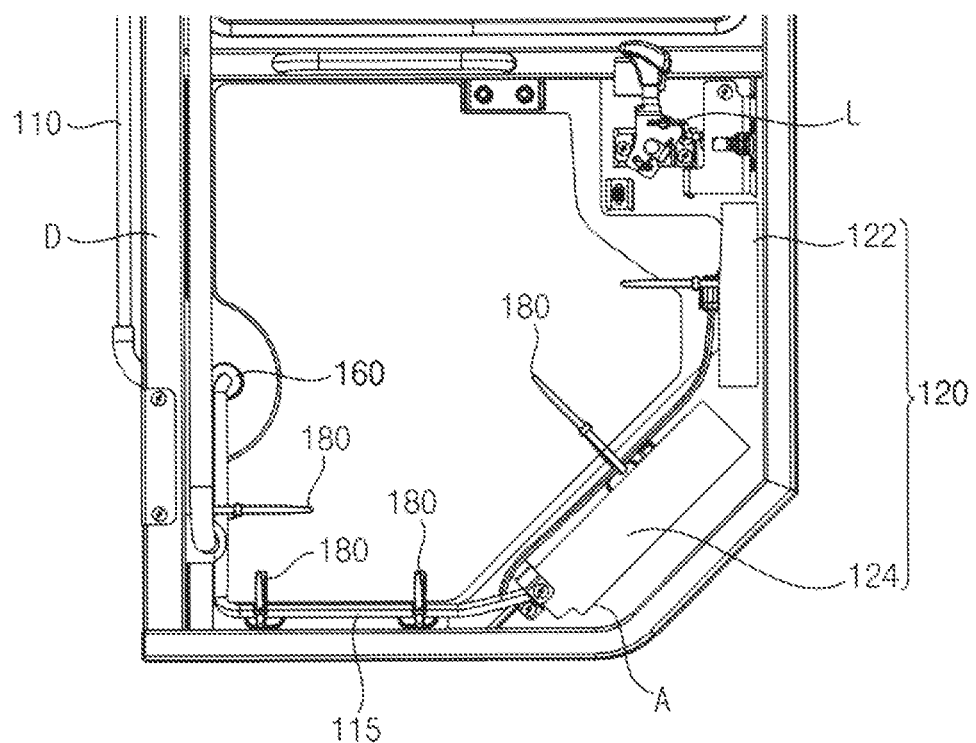

FIG. 1 is a perspective view illustrating a cabin of a construction machine with a smart door apparatus in accordance with example embodiments, FIG. 2 is a perspective view illustrating an internal structure of the smart door apparatus in FIG. 1, and FIG. 3 is a cross-sectional view illustrating a harness of the smart door apparatus in FIG. 2.

Referring to FIGS. 1 to 3, a door D may be installed at a cabin C of a construction machine. The construction machine may not be restricted within a specific construction machine. The door D may be locked to the cabin C by a locking apparatus L. One side surface of the door D may be rotatably connected with the cabin C via a hinge mechanism. Thus, the door D may be rotated with respect to an axial direction X of the hinge mechanism, i.e., a vertical axis.

In example embodiments, the hinge mechanism may include an upper hinge UH configured to rotatably connect an upper end of one side surface of the door D with the cabin C, and a lower hinge LH configured to rotatably connect a lower end of one side surface of the door D with the cabin C. The upper hinge UH may include an upper hinge pin UHP arranged in the axial direction X. The lower hinge LH may include a lower hinge pin LHP arranged in the axial direction X. The upper hinge pin UHP and the lower hinge pin LHP may be positioned on a same line along the axial direction X. Alternatively, the hinge mechanism may include one or at least three hinges.

The smart door apparatus may operate the locking apparatus L of the door D by signals of a smart key. The smart door apparatus may include an actuator 120 and a harness 100. The actuator 120 may be installed at an inner surface of the door D. The actuator 120 may receive the signals of the smart key to operate the locking apparatus L.

The harness 100 may be configured to supply electricity to the actuator 120. The harness 100 may include an outer portion 110 extended from a battery and arranged on an outer surface of the door D, and an inner portion 115 extended from the outer portion 110 into the door D and connected with the actuator 120.

The outer portion 110 may be extended from an upper surface of the cabin C to a lower end of the door D. In example embodiments, the outer portion 110 may have a linear shape extended in the axial direction X of the hinge mechanism. That is, the outer portion 110 may be positioned on a vertical line substantially the same as the axial direction X of the hinge mechanism. Particularly, the outer portion 110 may be extended between the upper hinge UH and the lower hinge LH in the axial direction X. Thus, the outer portion 110 may be rotated with respect to the axial direction X of the hinge mechanism. As a result, when the door D may be opened, only torsion may be applied to the outer portion 110 regardless of opening angles of the door D. That is, the outer portion 110 may not be bent regardless of the opening angles of the door D.

The inner portion 115 may be extended from the outer portion 110 through the door D. The inner portion 115 may be extended along the inner surface of the door D. The inner portion 115 may be fixed to the inner surface of the door D using a plurality of clips 180. The inner portion 115 may be connected to an upper end and a lower end of the actuator 120.

Figure 4:
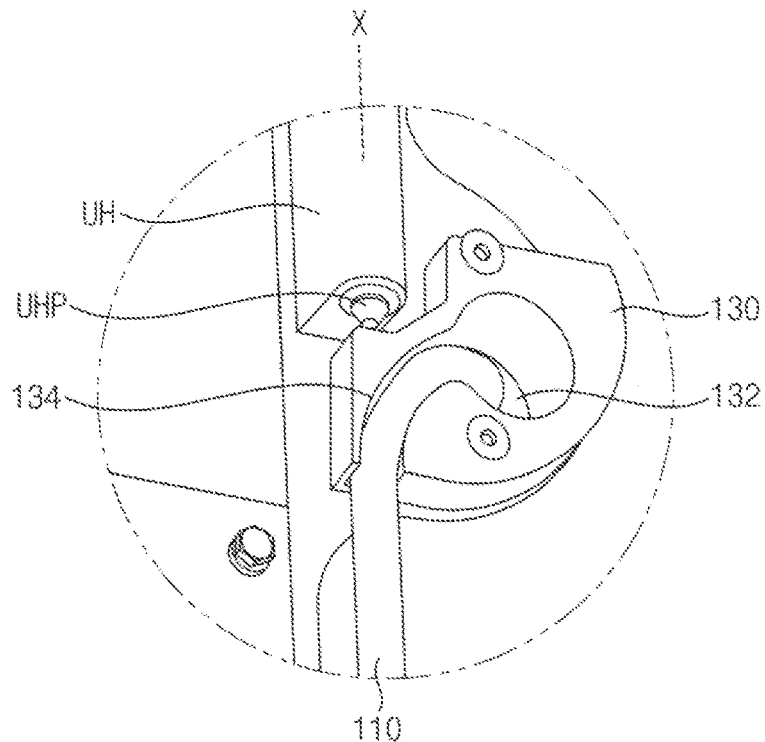
Figure 5:
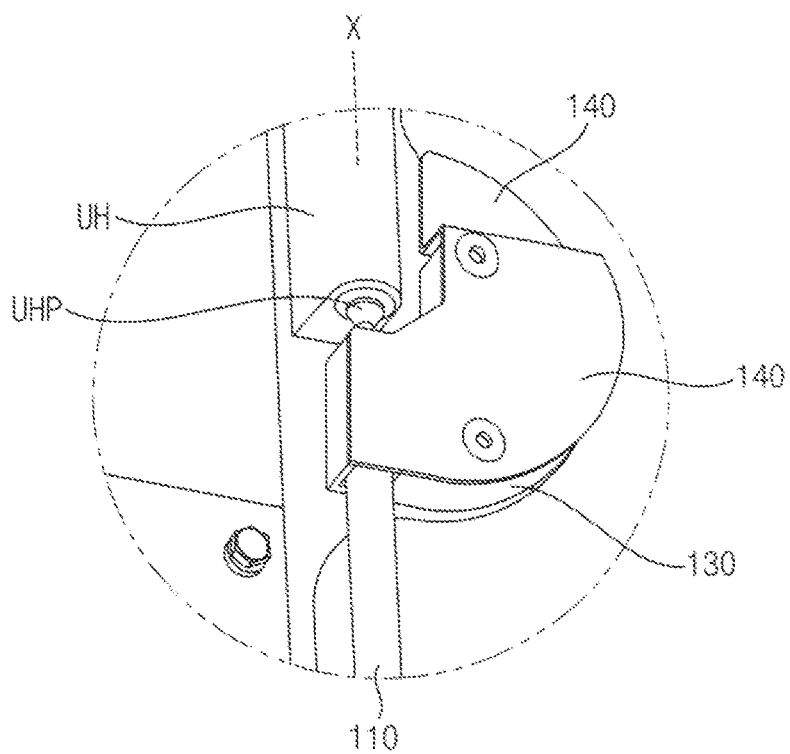

FIGS. 4 and 5 are perspective views illustrating an upper end of the harness of the smart door apparatus in FIG. 1.

Referring to FIGS. 4 and 5, the smart door apparatus may further include an upper clamp 130 and an upper cover 140.

The upper clamp 130 may be installed adjacent to the upper hinge UH. Particularly, the upper clamp 130 may be installed at a portion of the cabin C adjacent to the upper hinge UH. The upper clamp 130 may include an upper guide hole 132 and an upper guide groove 134.

The upper guide hole 132 may be horizontally formed through a portion of the upper clamp 130 right shifted from the axial direction X of the hinge mechanism. An upper end of the outer portion 110 of the harness 100 may be drawn out to the outer surface of the door D through the upper guide hole 132.

The upper guide groove 134 may be downwardly extended from the upper guide hole 132. The upper guide groove 134 may have an upper end connected to the upper guide hole 132, and a rounded lower end downwardly extended from the upper end. The lower end of the upper guide groove 134 may be positioned on the axial direction X of the upper hinge UH. That is, the lower end of the upper guide groove 134 may have an axial direction substantially the same as the axial direction X of the upper hinge UH. Thus, the upper end of the outer portion 110 drawn out through the upper guide hole 132 may be guided to be positioned on the axial direction X of the upper hinge UH along the upper guide groove 134.

The upper cover 140 may be configured to cover the upper clamp 130 and the upper end of the outer portion 110 of the harness 100. The upper cover 140 may be fixed to the upper clamp 130 and the door D using at least one bolt.

Figure 6:
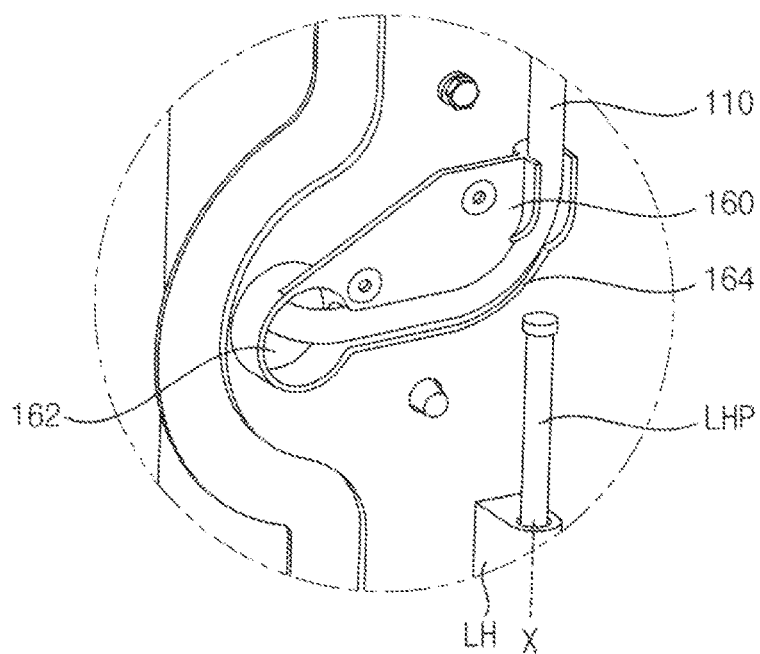
Figure 7:
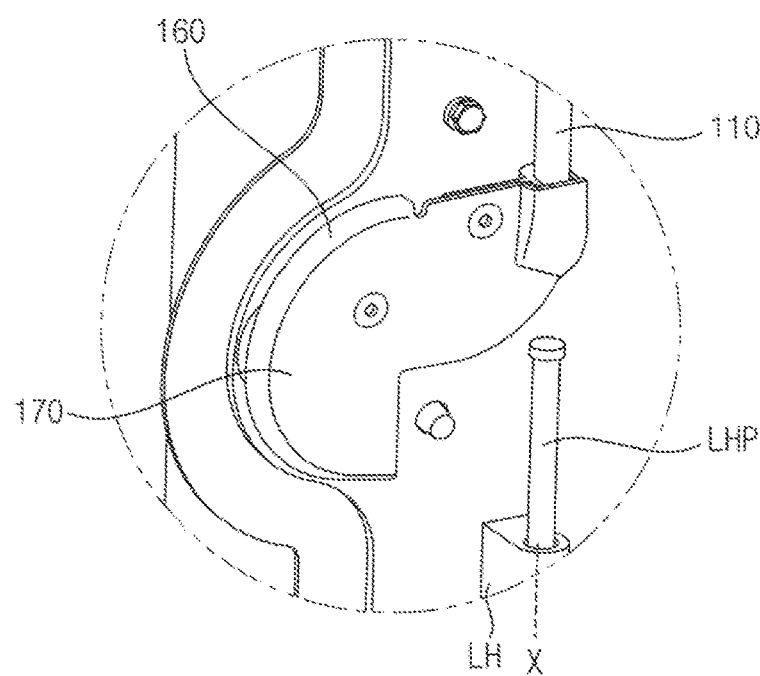

FIGS. 6 and 7 are perspective views illustrating a lower end of the harness of the smart door apparatus in FIG. 1.

Referring to FIGS. 6 and 7, the smart door apparatus may further include a lower clamp 160 and a lower cover 170.

The lower clamp 160 may be installed at a portion of the door D adjacent to the lower hinge LH. The harness 100 may be divided into the outer portion 110 in the door D and the inner portion 115 outside the door D with respect to the lower clamp 160. The lower clamp 160 may include a lower guide hole 162 and a lower guide groove 164.

The lower guide hole 162 may be horizontally formed through a portion of the lower clamp 160 left shifted from the axial direction X of the hinge mechanism. A lower end of the outer portion 110 of the harness 100 may be drawn out to the inner surface of the door D through the lower guide hole 162.

The lower guide groove 164 may be upwardly extended from the lower guide hole 162. The lower guide groove 164 may have a lower end connected to the lower guide hole 162, and a rounded upper end upwardly extended from the lower end. The upper end of the lower guide groove 164 may be positioned on the axial direction X of the lower hinge LH. That is, the upper end of the lower guide groove 164 may have an axial direction substantially the same as the axial direction X of the lower hinge LH. Thus, the lower end of the outer portion 110 extended through the lower end of the upper guide groove 134 to enter into the lower guide groove 164 may be positioned on the axial direction X of the lower hinge LH.

The lower cover 170 may be configured to cover the lower clamp 160 and the lower end of the outer portion 110 of the harness 100. The lower cover 170 may be fixed to the lower clamp 170 and the door D using at least one bolt.

Figure 8:
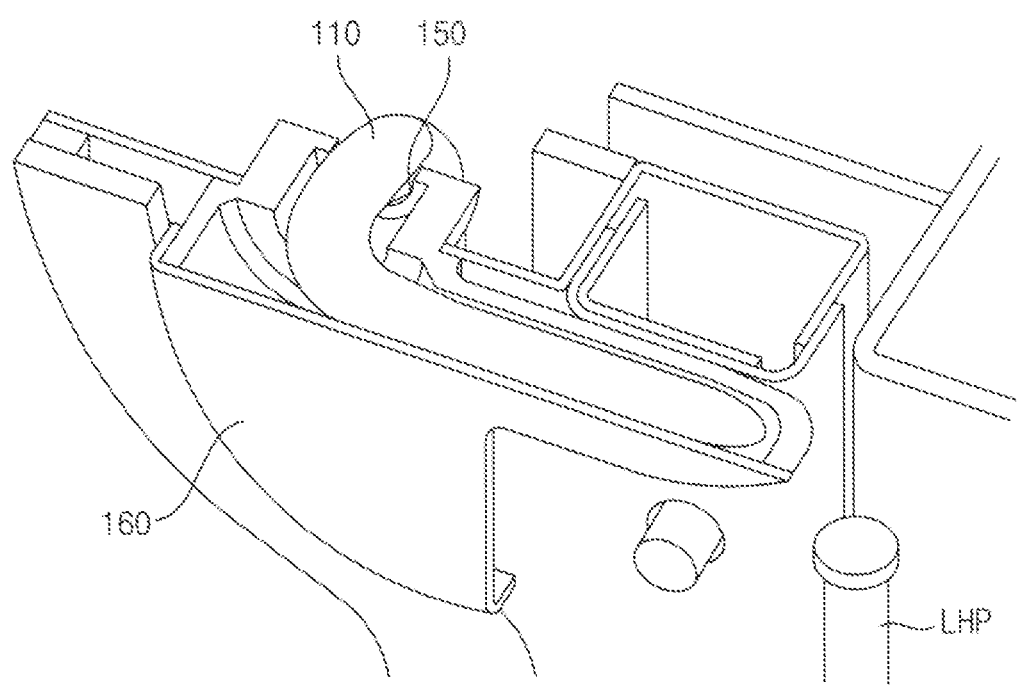

FIG. 8 is a perspective view illustrating an internal structure of the lower end of the harness in FIG. 7.

Referring to FIG. 8, a sealant 150 may be configured to fill an inner space of the lower clamp 160. The sealant 150 may be supplied to the inner space of the lower clamp 160 through a hole of the lower clamp 160. Particularly, the sealant 150 may fill the inner space between the lower clamp 160, the lower cover 170 and the lower end of the outer portion 110 of the harness 100. The inner portion 115 of the harness 100 extended into the door D through the lower clamp 160 may be fixed by the sealant 150. In contrast, because the outer portion 110 of the harness 100 on the axial direction X of the hinge mechanism may not be fixed, only the outer portion 110 of the harness 100 may be twisted when opening the door D. In example embodiments, the sealant 150 may include silicon. However, the sealant 150 may include other materials as well as the silicon.

Figure 9:
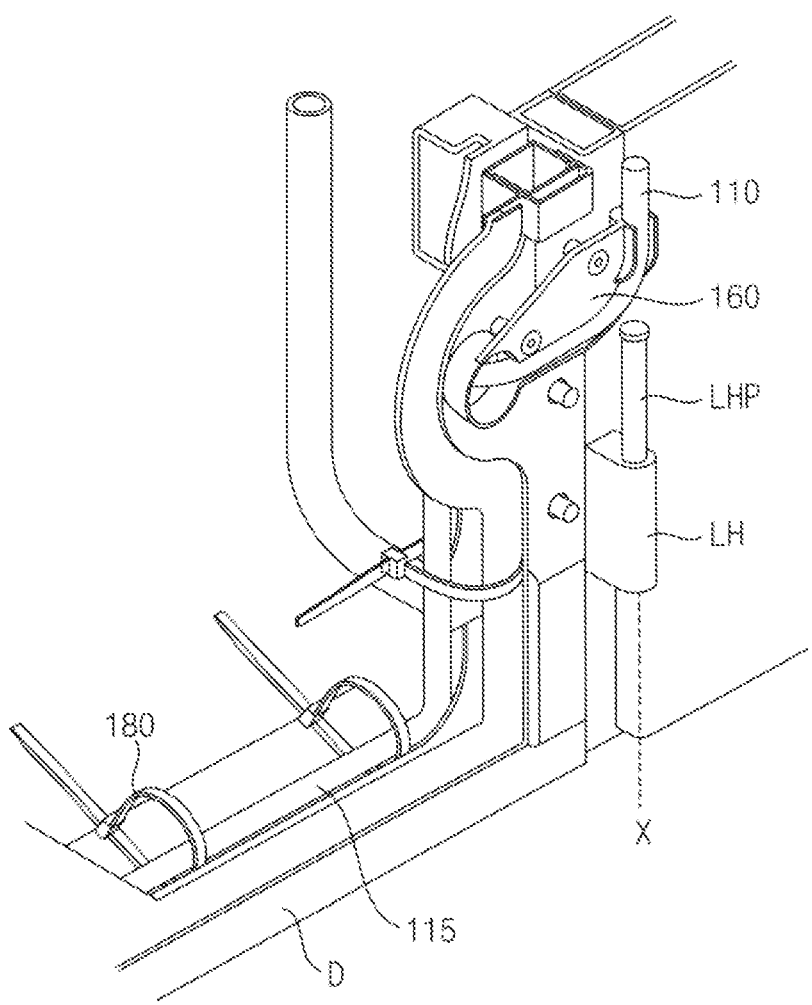
Figure 10:
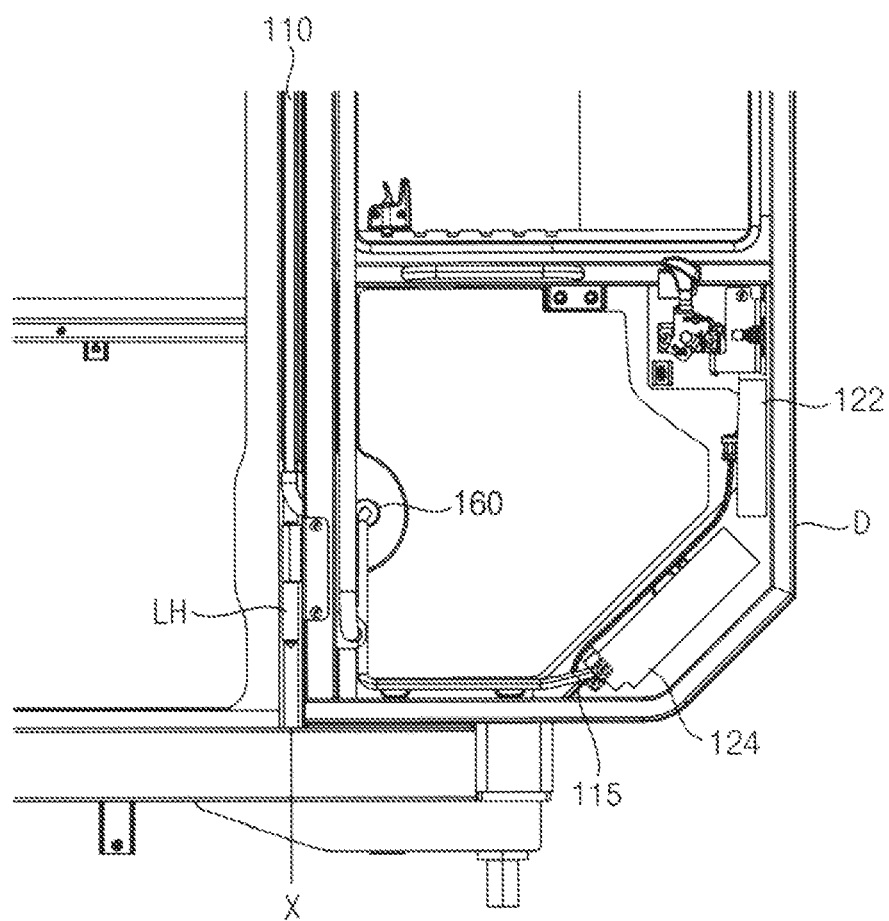

FIG. 9 is a perspective view illustrating a closed door in FIG. 1, and FIG. 10 is a perspective view illustrating an opened door in FIG. 1.

Referring to FIG. 9, when the door D may be closed, the outer portion 110 of the harness 100 may be positioned on the axial direction X of the hinge mechanism. As shown in FIG. 10, although the door D may be opened, the outer portion 110 of the harness 100 may also be positioned on the axial direction X of the hinge mechanism. That is, the outer portion 110 of the harness 100 may be always positioned on the axial direction X of the hinge mechanism regardless of the rotation angles of the door D. Therefore, a bending force may not be applied to the outer portion 110 of the harness 100. Only the torsion may be applied to the outer portion 110 of the harness 100 regardless of the rotation angles of the door D. As a result, the outer portion 110 of the harness 100 may not be disconnected to increase the lifespan of the harness 100.

According to example embodiments, the harness may be arranged in the axial direction of the hinge mechanism so that only torsion may be applied to the harness regardless of rotation angles of the door. Thus, the harness may not be bent by a rotation of the door to prevent a disconnection of the harness. As a result, a lifespan of the harness may be increased.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A smart door apparatus of a construction machine, the smart door apparatus comprising:
   an actuator installed at a door, which is rotatably connected with a cabin of the construction machine via a hinge mechanism and configured to operate a locking apparatus of the door by signals of a smart key; and
   a harness arranged in an axial direction of the hinge mechanism and configured to supply electricity to the actuator,
   wherein the harness is arranged on an outer surface of the door along the axial direction, and the harness enters into the door to be connected to the actuator.

2. The smart door apparatus of claim 1, further comprising at least one clip configured to fix the harness in the door to an inner surface of the door.

3. The smart door apparatus of claim 1, wherein the hinge mechanism comprises an upper hinge connected to an upper end of the door and a lower hinge connected to a lower end of the door, and the harness is extended between the upper hinge and the lower hinge along the axial direction.

4. The smart door apparatus of claim 3, further comprising:
   an upper clamp installed adjacent to the upper hinge to fix an upper end of the harness; and
   a lower clamp installed at the lower end of the door adjacent to the lower hinge to fix a lower end of the harness.

5. The smart door apparatus of claim 4, wherein the upper clamp comprises:
   an upper guide hole configured to receive the upper end of the harness; and
   an upper guide groove extended from the upper guide hole to guide the harness along the axial direction.

6. The smart door apparatus of claim 5, wherein the upper guide hole is shifted from the axial direction and a lower end of the upper guide groove is positioned on the axial direction.

7. The smart door apparatus of claim 4, wherein the lower clamp comprises:
   a lower guide hole configured to receive the lower end of the harness; and
   a lower guide groove extended from the lower guide hole to guide the harness along the axial direction.

8. The smart door apparatus of claim 7, wherein the lower guide hole is shifted from the axial direction, and an upper end of the lower guide groove is positioned on the axial direction.

9. The smart door apparatus of claim 4, further comprising:
   an upper cover configured to cover the upper clamp; and
   a lower cover configured to cover the lower clamp.

10. The smart door apparatus of claim 9, further comprising a sealant configured to fill a space between the lower cover, the lower clamp and the lower end of the harness to fix the harness.

* * * * *